(12) United States Patent
Zhou et al.

(10) Patent No.: US 8,036,313 B2
(45) Date of Patent: Oct. 11, 2011

(54) APPARATUS AND METHOD FOR INTERFERENCE CANCELLATION IN BROADBAND WIRELESS ACCESS COMMUNICATION SYSTEM

(75) Inventors: Huiqiang Zhou, Suwon-si (KR); Jeong-Soon Park, Suwon-si (KR); Min-Cheol Park, Suwon-si (KR); Jong-Han Lim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 910 days.

(21) Appl. No.: 12/071,029

(22) Filed: Feb. 14, 2008

(65) Prior Publication Data

US 2008/0205561 A1 Aug. 28, 2008

(30) Foreign Application Priority Data

Feb. 14, 2007 (KR) .......................... 10-2007-0015198

(51) Int. Cl.
*H03K 9/00* (2006.01)
(52) U.S. Cl. ........................................ 375/316; 375/346
(58) Field of Classification Search .................. 375/316, 375/324, 325, 326, 346
See application file for complete search history.

(56) References Cited

U.S. PATENT DOCUMENTS

| 2006/0012520 A1* | 1/2006 | Tsai et al. ..................... 342/377 |
| 2006/0140293 A1 | 6/2006 | Lai et al. |

FOREIGN PATENT DOCUMENTS

| KR | 1020020095024 | 12/2002 |
| KR | 1020060036086 | 4/2006 |
| KR | 1020070007029 | 1/2007 |

* cited by examiner

*Primary Examiner* — Chieh M Fan
*Assistant Examiner* — Jaison Joseph
(74) *Attorney, Agent, or Firm* — Roylance, Abrams, Berdo & Goodman, L.L.P.

(57) ABSTRACT

Provided are an apparatus and method for interference cancellation in a BWA communication system. In a receiving apparatus for the interference cancellation, a preamble correlation measurer measures a preamble correlation coefficient from a preamble of a signal received signal. A data rearranger determines a block size to divide the received signal from the preamble correlation coefficient, divides the signal according to the determined block size, and rearranges the divided signals in a Space-Time coding (STC) mode. An estimate weight calculator cross-correlates the output signals of the data rearranger, rearranges the cross-correlated signals, auto-correlates the rearranged signals, and calculates an estimate weight to perform an interpolation operation. An estimate signal decoding/combining unit detects desired signals from signals estimated by the estimate weight calculator and combines the detected signals.

21 Claims, 9 Drawing Sheets

(CONVENTIONAL ART)

APPARATUS AND METHOD FOR INTERFERENCE CANCELLATION IN BROADBAND WIRELESS ACCESS COMMUNICATION SYSTEM

PRIORITY

This application claims priority under 35 U.S.C. §119 from Korean Patent Application No. 2007-15198 filed on Feb. 14, 2007, in the Korean Intellectual Property Office, the entire contents of which are incorporated herein by reference.

BACKGROUND OF THE INVENTION

1. Field of the Invention

The present invention relates generally to interference cancellation, and in particular, to an apparatus and method for canceling the interference of a neighbor cell in a Broadband Wireless Access (BWA) communication system based on a Multiple Input Multiple Output (MIMO) technique. An IEEE (Institute of Electrical and Electronics Engineers) 802.16e system using an Orthogonal Frequency Division Multiple Access (OFDMA) scheme as a physical layer scheme will be described as an example of the BWA communication system of an exemplary embodiment of the present invention.

2. Description of the Related Art

Figure 1:
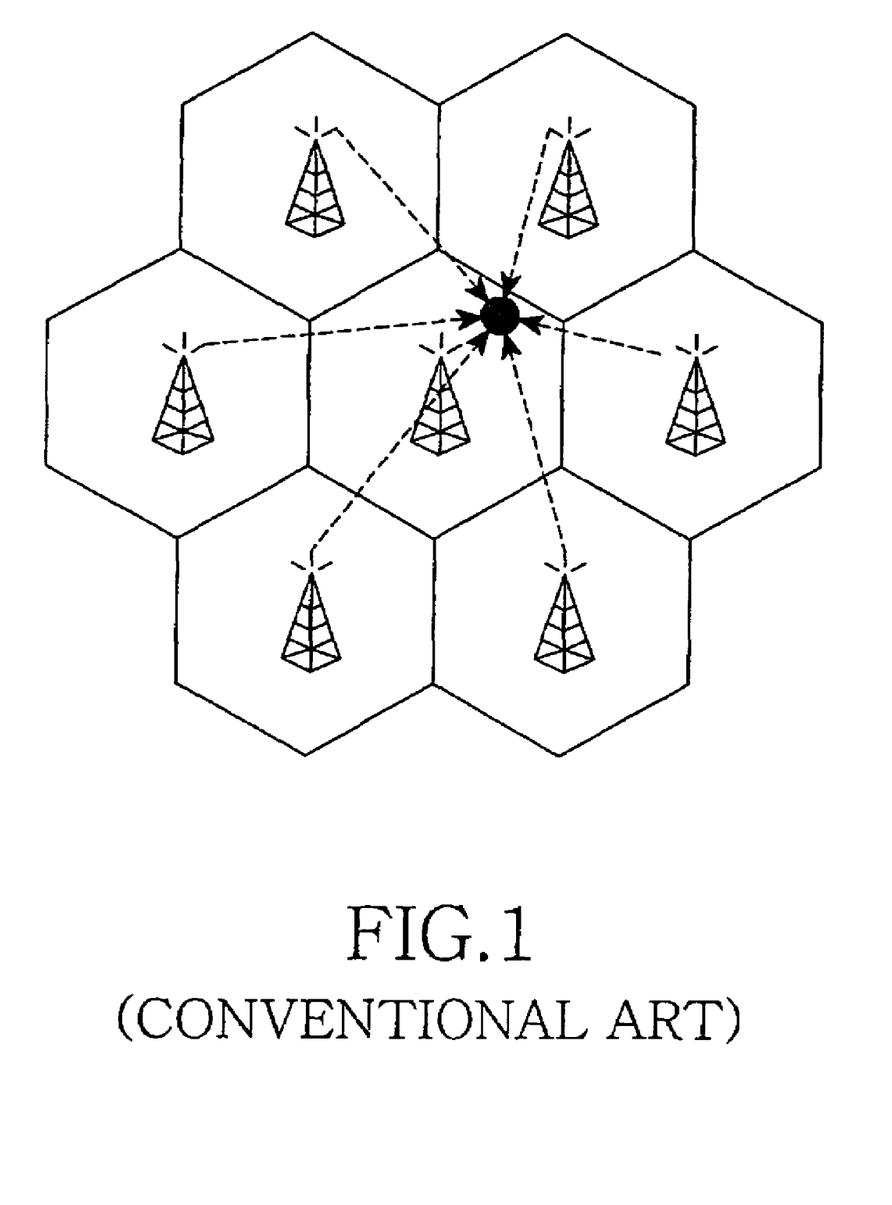
FIG. 1 is a diagram illustrating a cell structure of a general BWA communication system.

FIG. 1 is a diagram illustrating a cell structure of a general BWA communication system.

Referring to FIG. 1, the BWA communication system uses an inter-cell frequency reuse factor of 1 in order to enhance the frequency efficiency in a multi-cell environment. This is because a mobile station (MS) at the edge of a serving cell may suffer interferences from neighboring cells.

The BWA communication system allocates preambles of downlink (DL) frames to different subcarriers depending on their sectors. Thus, the preambles can be orthogonal to one another. However, other frames except the above preambles allocate pilots to subcarriers without discrimination between cells or sectors and therefore may suffer a signal interference from other cells or sectors. Moreover, when a frame of a signal of an interference cell uses a different permutation, a pilot of a serving cell is distorted by an interfering signal, which makes it difficult to estimate channel information from a signal of the serving cell as well as from a signal of the interference cell.

Figure 2:
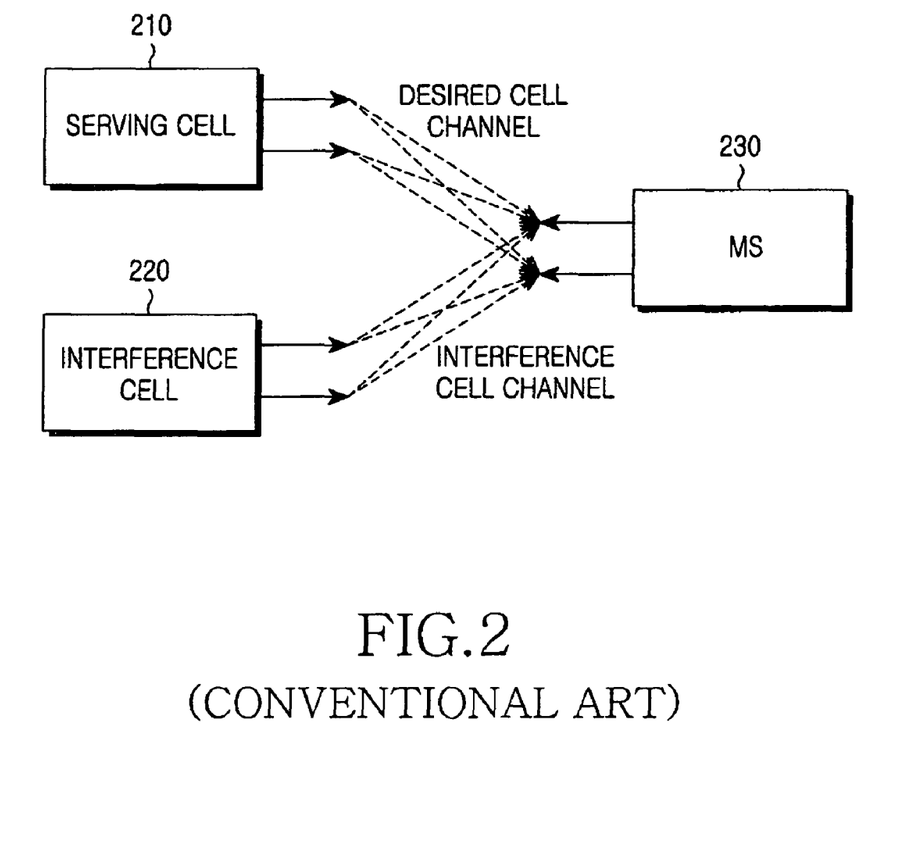
FIG. 2 is a diagram illustrating a signal reception scheme of a mobile station in a general BWA communication system.

FIG. 2 is a diagram illustrating a signal reception scheme of a mobile station in a general BWA communication system.

Referring to FIG. 2, a consideration is given to the case where a mobile station (MS) 230 uses a Minimum Mean Square Error (MMSE) technique to estimate channel information. A channel matrix for a serving cell 210 becomes a 2×2 matrix, because a base station (BS) of the serving cell 210 has two TX antennas and the mobile station 230 has two RX antennas.

A conventional channel estimation scheme estimates a channel value by detecting a pilot subcarrier from an RX signal and dividing the detected value by a known pilot value. However, when the mobile station 230 is located at the edge of the serving cell 210, it receives an interfering signal (that is, an interference component) from a neighboring cell 220.

In this case, because the channel matrix becomes a 2×(N+2) matrix in which columns are larger in number than rows, it is difficult to detect a desired signal from an RX signal and cancel the interference thereof. This environment is modeled as Equation (1):

$$\begin{bmatrix} r_1(n) \\ r_2(n) \end{bmatrix} = \begin{bmatrix} h_{s,1,1}(n), h_{s,2,1}(n), h_{i,1,1}(n), \ldots, h_{s,K,1}(n) \\ h_{s,1,2}(n), h_{s,2,2}(n), h_{i,2,1}(n), \ldots, h_{s,K,2}(n) \end{bmatrix} \begin{bmatrix} x_{s,1}(n) \\ x_{s,2}(n) \\ x_{i,1}(n) \\ \ldots \\ x_{i,K}(n) \end{bmatrix} + \begin{bmatrix} n_1 \\ n_2 \end{bmatrix} \quad (1)$$

where $r_i$ denotes an RX signal of the $i^{th}$ RX antenna, $h_{s,m,j}$ denotes a channel value between the $m^{th}$ TX antenna and the $j^{th}$ RX antenna, $h_{i,n,k}$ denotes a channel value of the $n^{th}$ interference cell of the $k^{th}$ TX antenna, $x_{s,m}$ denotes the $m^{th}$ TX signal of the serving cell, $x_{i,k}$ denotes a TX signal of the $k^{th}$ interference cell, and $n_i$ denotes a noise component.

When MIMO multiple antennas are used, pilots are generally transmitted through the $0^{th}$ antenna and the $1^{st}$ antenna alternately. That is, when a pilot is transmitted through the $0^{th}$ antenna, a pilot is not transmitted at the subcarrier position of the $1^{st}$ antenna. Likewise, when a pilot is transmitted through the $1^{st}$ antenna, said pilot is not transmitted at the subcarrier position of the $0^{th}$ antenna. Thus, the conventional MIMO channel estimation scheme can avoid an inter-antenna interference.

However, as described above, the neighboring cell signals act as interferences with RX pilots, thus degrading the channel estimation performance. This channel estimation performance degradation reduces the reliability of TX data acquisition. In this situation, because all the signals are mixed in the same subcarrier at the same time, an estimated channel value according to the conventional channel estimation scheme becomes different from an accurate channel value. This difference degrades the data recovery performance.

Accordingly, there is a need for an apparatus and method for canceling the interference of a neighbor cell in a Broadband Wireless Access (BWA) communication system based on a Multiple Input Multiple Output (MIMO) technique.

SUMMARY OF THE INVENTION

Exemplary embodiments of the present invention substantially solve at least the above problems and/or disadvantages and to provide at least the advantages below. Accordingly, an object of exemplary embodiments of the present invention is to provide an apparatus and method for interference cancellation in a BWA communication system using an MIMO technique.

It is another object of an exemplary embodiment of the present invention to provide an apparatus and method for canceling an interference signal from a channel matrix in an MIMO-based BWA communication system by increasing the number of signal dimensions in the channel matrix using a Space-Time Coding (STC) mode.

According to one object of an exemplary embodiment of the present invention, there is provided an apparatus and method for increasing the signal estimation performance in an MIMO-based BWA communication system by measuring the correlation of channels on the time/frequency axis, determining a block size suitable for the measured correlation, rearranging RX signals for expansion to a channel matrix, performing cross-correlation and auto-correlation on the rearranged signals, and performing signal estimation using the resulting correlation values.

According to another aspect of an exemplary embodiment of the present invention, a receiving apparatus for canceling interference in a BWA communication system includes: a wireless communication module for receiving signals from RX antennas; a preamble correlation measurer for measuring a preamble correlation coefficient from a preamble of the signal received by the wireless communication module; a data rearranger for determining a block size to divide the received signal from the preamble correlation coefficient, dividing the signal according to the determined block size, and rearranging the divided signals in an STC mode; an estimate weight calculator for cross-correlating output signals of the data rearranger, rearranging the cross-correlated signals, auto-correlating the rearranged signals, and calculating an estimate weight to perform an interpolation operation; and an estimate signal decoding/combining unit for detecting desired signals from signals estimated by the estimate weight calculator and combining the detected signals.

According to a further aspect of an exemplary embodiment of the present invention, a method for canceling the interference of a receiving apparatus in a BWA communication system includes: receiving signals from RX antennas; measuring a preamble correlation coefficient from a preamble of the received signal; determining a block size to divide the received signal from the preamble correlation coefficient, dividing the signal according to the determined block size, and rearranging the divided signals in an STC mode; cross-correlating the resulting signals of the rearrangement of the divided signals and rearranging the cross-correlated signals; auto-correlating the resulting signals of the rearrangement of the cross-correlated signals and calculating an estimate weight to perform an interpolation operation; and detecting desired signals from the resulting signals of the interpolation operation and combining the detected signals.

According to still a further aspect of exemplary embodiment of the present invention, a system for interference cancellation in a BWA communication system includes: a plurality of base stations for transmitting signals; and a receiving apparatus for receiving signals from the base stations; measuring a preamble correlation coefficient from a preamble of the received signal; determining a block size to divide the received signal from the preamble correlation coefficient, dividing the signal according to the determined block size, and rearranging the divided signals in an STC mode; cross-correlating the resulting signals of the rearrangement of the divided signals and rearranging the cross-correlated signals; auto-correlating the resulting signals of the rearrangement of the cross-correlated signals and calculating an estimate weight to perform an interpolation operation; and detecting desired signals from the resulting signals of the interpolation operation and combining the detected signals.

Other objects, advantages, and salient features of the present invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description when taken in conjunction with the accompanying drawings in which.

Throughout the drawings, the same drawing reference numerals will be understood to refer to the same elements, features, and structures.

DETAILED DESCRIPTION OF EXEMPLARY EMBODIMENTS

The matters exemplified in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Hereinafter, a description will be given of apparatus and method for interference cancellation in a BWA communication system according to an exemplary embodiment of the present invention.

Two auxiliary theorems are introduced first and then an exemplary embodiment of the present invention is described using the two auxiliary theorems. The two auxiliary theorems are an MMSE (Minimum Mean Square Error) weight vector theorem and an STC (Space-Time Coding) equivalent channel matrix transform theorem.

The MMSE weight vector theorem is derived as Equations (2) through (4) below.

It is assumed that data of a serving cell is the product of an RX signal and an MMSE weight matrix.

$$\tilde{x}_d = WY \quad (2)$$

where $x_d$ denotes data of a serving cell, Y denotes an RX signal, and a vector W denotes an MMSE weight matrix.

An equation satisfying the MMSE for a specific W is expressed as Equation (3):

$$\frac{\partial |x_d - \tilde{x}_d|^2}{\partial W^H} = \frac{\partial E[x_d \tilde{x}_d - WYx_d^* - x_d Y^H W^H + WYY^H W^H]}{\partial W^H} \quad (3)$$

$$= E[-x_d Y^H + WYY^H] = 0$$

where $x_d$ denotes an original signal and $\tilde{x}_d$ denotes an estimated signal.

An MMSE weight vector W satisfying the MMSE is obtained as Equation (4):

$$W = E[x_d Y^H](E[YY^H])^{-1} \quad (4)$$

where $E[x_d Y^H]$ denotes an expected value of the cross-correlation of the original signal and the estimated signal and $E[YY^H]$ denotes an expected value of the auto-correlation of the RX signal.

Herein, the cross-correlation value is calculated using training data such as pilots, while the auto-correlation value is calculated using only the RX signal.

Also, the calculated values in all the blocks are averaged on the assumption that a channel in one block does not change with respect to the time/frequency axis. Herein, the block is determined by a channel correlation measured on the time/frequency axis.

Figure 5:
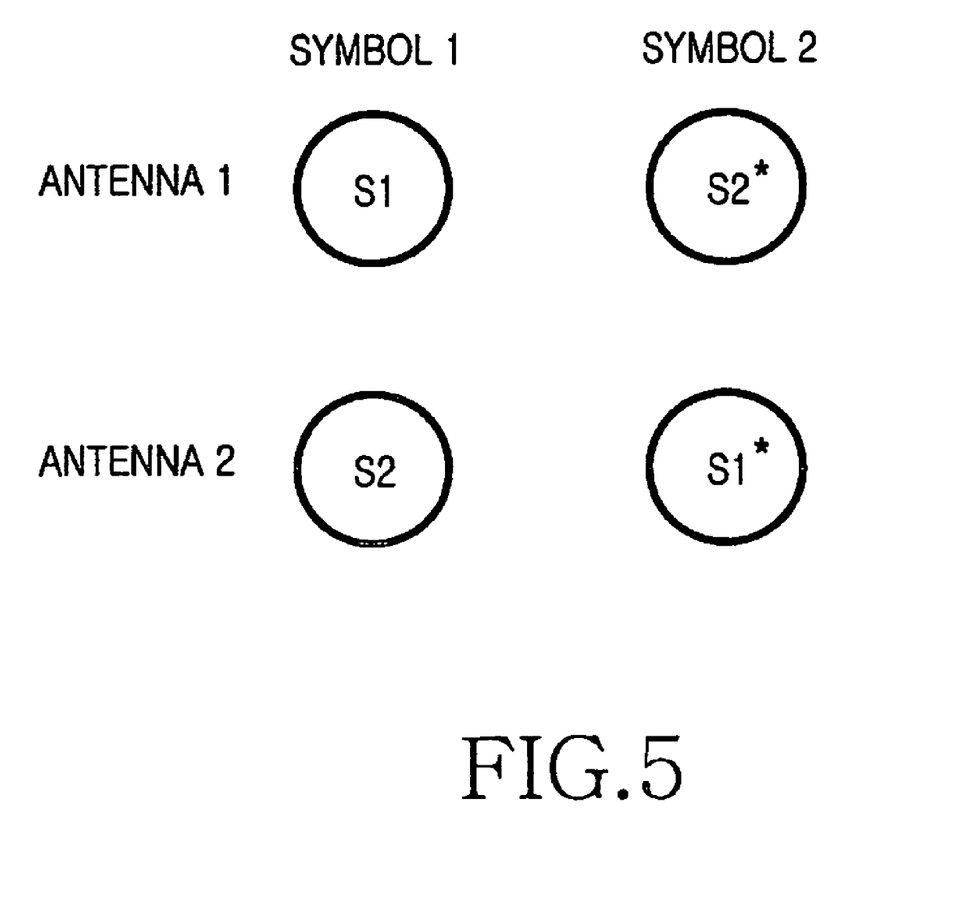
FIG. 5 is a diagram illustrating an Alamouti STC scheme according to an exemplary embodiment of the present invention.

FIG. 5 shows an Alamouti STC scheme, wherein antennas 1 and 2 receive a desired signal (S1, S1*) and an interfered signal (S2, S2*) simultaneously.

An STC reception model for the BWA communication system can be expressed as Equation (5):

$$\begin{bmatrix} r_1(n) \\ r_2(n) \end{bmatrix} = \begin{bmatrix} h_{1,1}(n), h_{2,1}(n) \\ h_{1,2}(n), h_{2,2}(n) \end{bmatrix} \begin{bmatrix} s_1 \\ s_2 \end{bmatrix} + N; \quad (5)$$

$$\begin{bmatrix} r_1(n+1) \\ r_2(n+1) \end{bmatrix} = \begin{bmatrix} h_{1,1}(n+1), h_{2,1}(n+1) \\ h_{1,2}(n+1), h_{2,2}(n+1) \end{bmatrix} \begin{bmatrix} -s_2^* \\ s_1^* \end{bmatrix} + N$$

$$\approx \begin{bmatrix} h_{1,1}(n), h_{2,1}(n) \\ h_{1,2}(n), h_{2,2}(n) \end{bmatrix} \begin{bmatrix} -s_2^* \\ s_1^* \end{bmatrix} + N$$

$$= conj\left(\begin{bmatrix} h_{2,1}^*(n), -h_{1,1}^*(n) \\ h_{2,2}^*(n), -h_{1,2}^*(n) \end{bmatrix} \begin{bmatrix} s_1 \\ s_2 \end{bmatrix}\right) + N$$

where $s_i$ denotes a TX signal of the $i^{th}$ TX antenna, $h_{i,j}$ denotes a channel value between the $i^{th}$ TX antenna and the $j^{th}$ RX antenna, conj( ) denotes a conjugate complex number, $r_i(n)$ denotes the $i^{th}$ RX signal of the $n^{th}$ symbol, and N denotes a noise.

The two equations in Equation (5) can be combined as Equation (6):

$$\begin{bmatrix} r_1(n) \\ r_2(n) \\ r_1(n+1)^* \\ r_2(n+1)^* \end{bmatrix} \approx \begin{bmatrix} h_{1,1}(n), h_{2,1}(n) \\ h_{1,2}(n), h_{2,2}(n) \\ h_{2,1}^*(n), -h_{1,1}^*(n) \\ h_{2,2}^*(n), -h_{1,2}^*(n) \end{bmatrix} \begin{bmatrix} s_1 \\ s_2 \end{bmatrix} + N \quad (6)$$

where $r_1$ and $r_2$ denotes RX symbols and $s_1$ and $s_2$ denotes TX symbols.

When two consecutive RX symbols are rearranged as Equation (6), a (4×2)-dimensional new MIMO relationship can be obtained. In this model, because a channel matrix has more rows than columns, it can be said that dimensions are additionally provided to cancel interference components.

A system containing an interference component can be modeled as the following Equation (7). Herein, a single MIMO STC type interference is assumed for simple expression. In other cases, TX signals are expressed in different ways, and the interference can also be cancelled partially or entirely. The canceling capability varies depending on the number of interference cells.

$$\begin{bmatrix} r_1(n) \\ r_2(n) \\ r_1(n+1)^* \\ r_2(n+1)^* \end{bmatrix} \approx \begin{bmatrix} h_{s,1,1}(n), h_{s,2,1}(n), h_{i,1,1}(n), h_{i,2,1}(n) \\ h_{s,1,2}(n), h_{s,2,2}(n), h_{i,1,2}(n), h_{i,2,2}(n) \\ h_{s,2,1}^*(n), -h_{s,1,1}^*(n), h_{i,2,1}^*(n), -h_{i,1,1}^*(n) \\ h_{s,2,2}^*(n), -h_{s,1,2}^*(n), h_{i,2,2}^*(n), -h_{i,1,2}^*(n) \end{bmatrix} \begin{bmatrix} S_{s1} \\ S_{s2} \\ S_{i1} \\ S_{i2} \end{bmatrix} + N = \quad (7)$$

$$HS + N$$

where $r_1$ and $r_2$ denotes RX symbols, $s_1$ and $s_2$ denotes TX symbols, and N denotes noise.

Based on Equation (7), the interference effect can be removed using an MMSE weight vector algorithm.

An interference cancellation scheme according to an exemplary embodiment of the present invention will be described below in detail based on the above analysis and auxiliary theorems.

Block division is very important for the use of the MMSE weight vector algorithm. If a block size is large, relatively many pilots are used for calculation of a cross-correlation and an auto-correlation and a more accurate value can be obtained from the resulting average effect. However, a channel changes within the size of a divided block, which is unsuitable for the assumption for the average effect. Thus, there is an error in the resulting value because of the unsuitability of the assumption due to the channel change.

On the other hand, if the block size is small, the channel can be regarded as a constant, but the calculated values of cross-correlation and auto-correlation matrixes do not become sufficiently accurate because the number of samples used for the calculation is small. This discrepancy must be adaptively adjusted based on the channel correlation of subcarriers on the time/frequency axis.

When the channel maintains a high correlation on the time/frequency axis, the block size must be larger, which indicates that more pilot points must be provided as a sample necessary for the calculation. On the other hand, if the channel has a low correlation, the block size must be reduced to the extent that the channel does not change in one block.

Because each frame preamble pilot maintains inter-cell orthogonality without interference, an approximate correlation coefficient can be obtained from the preamble and the block size can be adaptively determined using the results. An adaptive MMSE weight vector algorithm of an exemplary embodiment of the present invention for reducing the interference effect includes the following five steps.

In the first step, channel correlation measurement is performed to determine the block size on the time/frequency axis. In an interference environment, a conventional scheme (for example, a scheme using pilots or CPs in data zones) cannot accurately measure a channel correlation due to the effect of an interference signal. Thus, pilots are used in frame preambles. These pilots have a small interference because they are orthogonal on the frequency axis.

Figure 6:
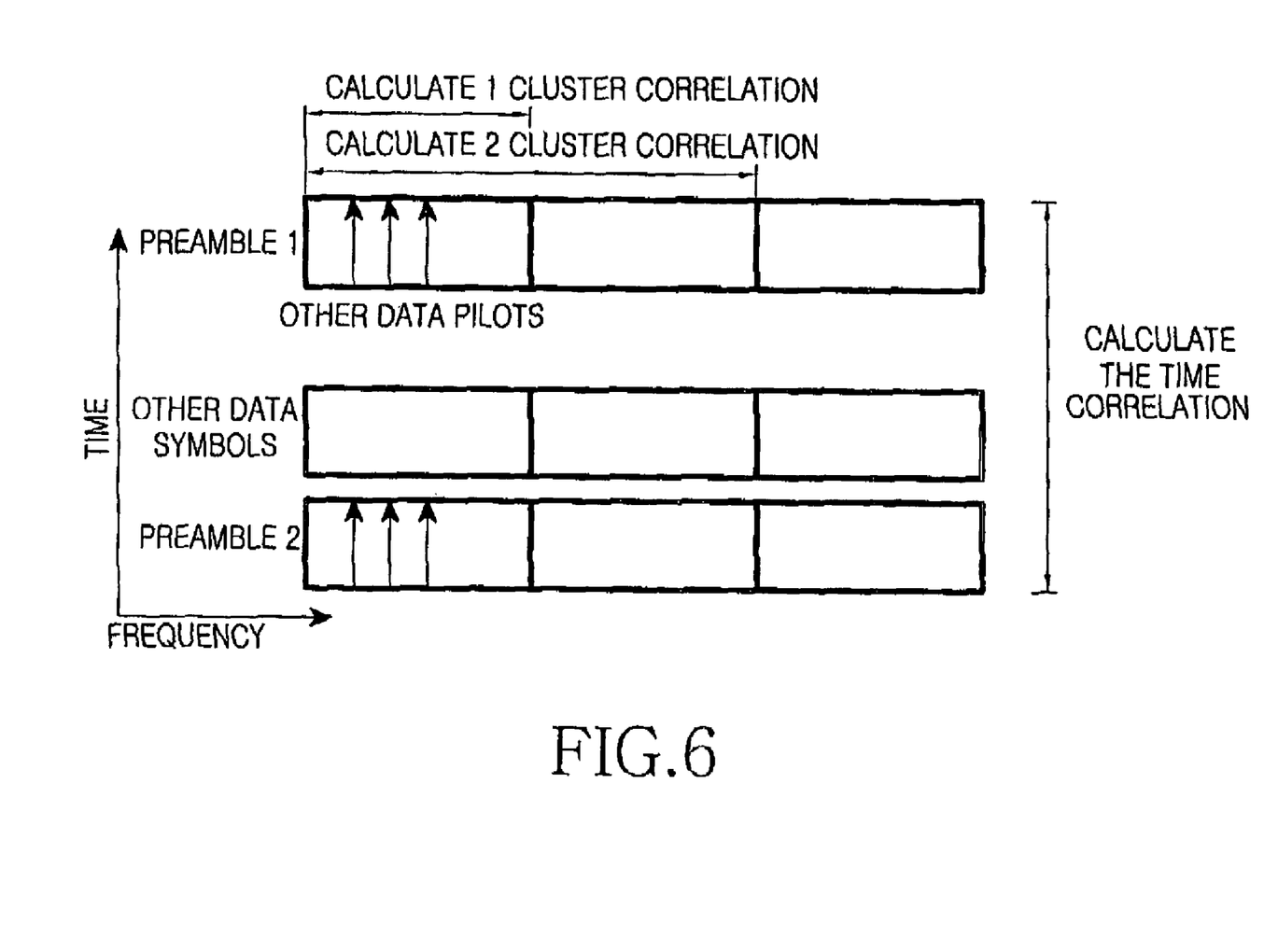
FIG. 6 is a diagram illustrating a channel correlation measurement scheme according to an exemplary embodiment of the present invention.

The block size on the frequency axis may be determined using a pilot signal received in a preamble. As illustrated in FIG. 6, a frequency correlation between clusters is calculated using a predetermined number of preamble symbols. For example, assuming that a threshold value 'a' of a correlation coefficient is 0.9, if a frequency correlation coefficient is not smaller than the threshold value 'a', the block size on the frequency axis is determined as the largest cluster number.

The block size on the time axis may be determined using a correlation coefficient between preambles. As illustrated in FIG. 6, a time correlation coefficient between preambles is calculated using pilots of all the received preambles. Because the preambles of each frame are spaced apart in terms of time, a correlation coefficient (particularly in a high-speed mobile station) is much smaller than 1.

When one frame includes 50 symbols in the simulation, a correlation coefficient between two adjacent preambles is measured to be about 0.8 in an ITU "Pedestrian A Channel 3 km/h" environment, and about 0.4 in an ITU "Vehicular A Channel 60 km/h" environment.

Thus, the approximately measured value is used to determine the block size on the time axis, and it is unnecessary to obtain an accurate measurement value in the present system. The block size is determined using the approximately measured correlation coefficient value, as shown in Table 1 below. Table 1 indicates that four block sizes can be used according to correlation coefficient values.

TABLE 1

|  | Time correlation (>0.6) | Time correlation (<0.6) |
| --- | --- | --- |
| Frequency correlation (>0.9) | 8 symbols × 3 clusters | 4 symbols × 3 clusters |
| Frequency correlation (<0.9) | 8 symbols × 2 clusters | 4 symbols × 2 clusters |

Figure 7:
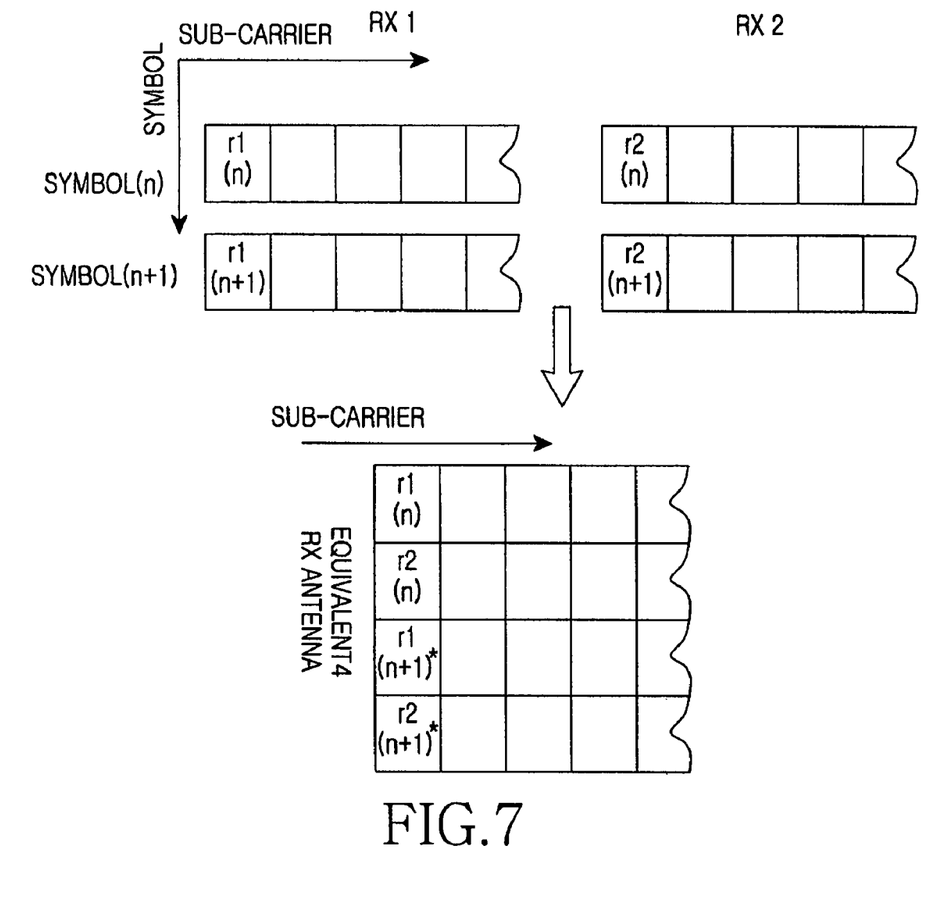
FIG. 7 is a diagram illustrating an RX signal rearrangement scheme according to an exemplary embodiment of the present invention.

In the second step, RX signals are rearranged as illustrated in FIG. 7. The RX signals are rearranged such that the $(n+1)^{th}$ signal follows the $n^{th}$ signal with respect to all the subcarriers, thereby creating a new 4×1 matrix vector.

In the third step, the cross-correlation and the auto-correlation are calculated. After rearrangement in the format of the new 4×1 matrix vector, cross-correlation and auto-correlation matrixes may be calculated based on Equation (4).

Figure 8:
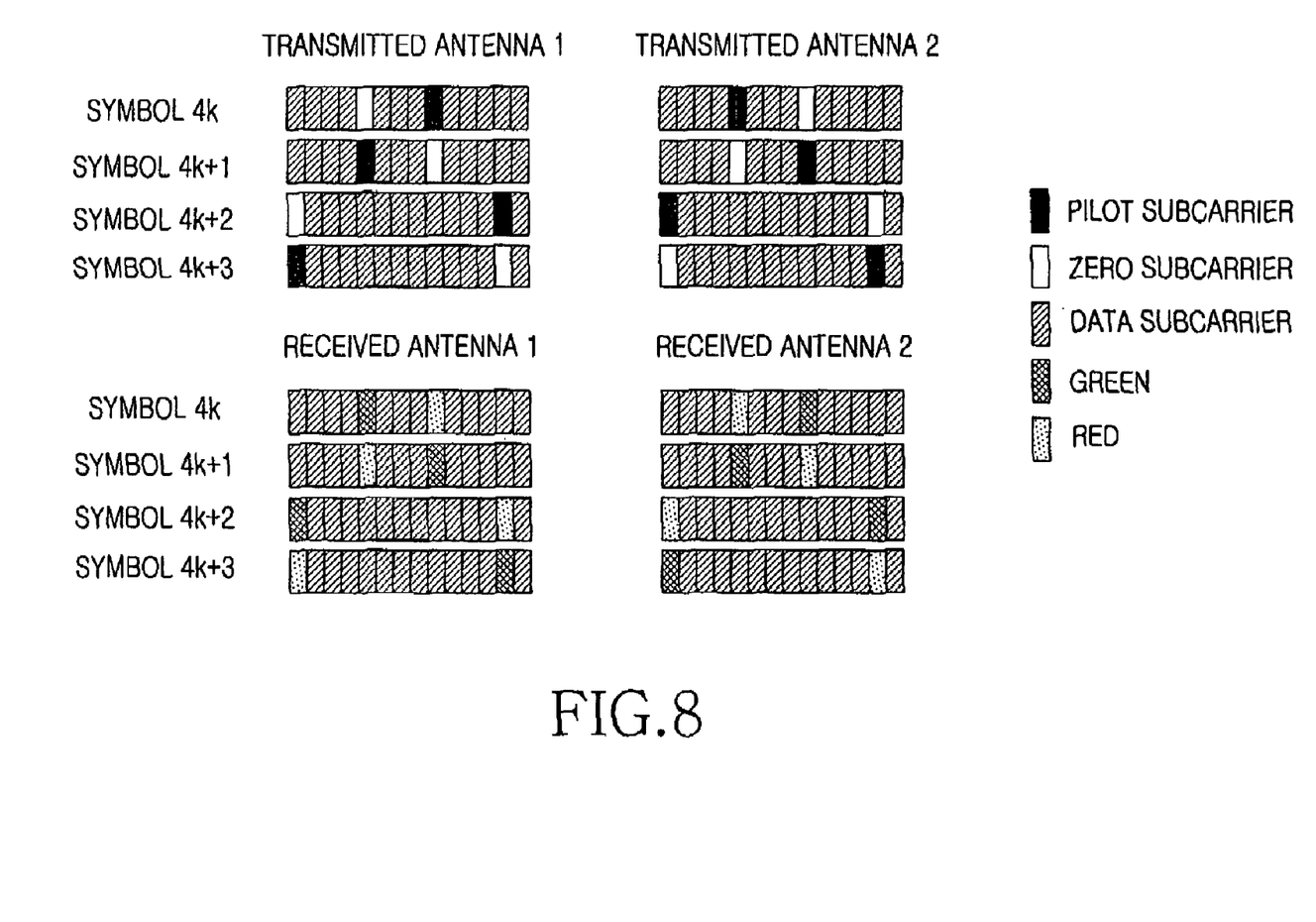
FIG. 8 is a diagram illustrating a scheme of calculating a cross-correlation between a pilot signal and an RX signal according to an exemplary embodiment of the present invention.

First, for calculation of the cross-correlation, pilots must be used within the range of the block size of a desired data symbol interval. Herein, assuming that the block size is 4×1 (symbols by clusters), the cross-correlation can be calculated as FIG. 8 and Equation (8):

$$E(s_{pilot}r^H) = \begin{bmatrix} \frac{1}{P}\sum_{i=1}^{P} s_{pilot,i} r^*_{red,1}, & \frac{1}{P}\sum_{i=1}^{P} s_{pilot,i} r^*_{green,1} \\ \frac{1}{P}\sum_{i=1}^{P} s_{pilot,i} r^*_{green,2}, & \frac{1}{P}\sum_{i=1}^{P} s_{pilot,i} r^*_{red,2} \end{bmatrix} \quad (8)$$

$$\approx \begin{bmatrix} h_{s,1,1}, & h_{s,2,1} \\ h_{s,1,2}, & h_{s,2,2} \end{bmatrix}$$

where P is the number of pilots, which is M×N (P=M×N for M symbols by N clusters).

In FIG. 8, a subcarrier signal represented by red color in a received (RX) antenna 1 is the product by a channel matrix $h_{1,1}$ in a 2×2 MIMO system model, and a subcarrier signal represented by green color in the received antenna 1 is the product by a channel matrix $h_{2,1}$ in the 2×2 MIMO system model. This is similarly applied to a received antenna 2. In an ideal environment (that is, an environment without interference and noise), the cross-correlation value is equal to the channel matrix of the serving cell.

After calculation of the cross-correlation matrix, because each of the elements of the cross-correlation matrix corresponds to a channel coefficient "c", a new matrix B can be expressed as Equation (9):

$$B = \begin{bmatrix} c_{1,1}, & c_{2,1} \\ c_{1,2}, & c_{2,2} \\ c^*_{2,1}, & -c^*_{1,1} \\ c^*_{2,2}, & -c^*_{1,2} \end{bmatrix} \approx \begin{bmatrix} h_{s,1,1}, & h_{s,2,1} \\ h_{s,1,2}, & h_{s,2,2} \\ h^*_{s,2,1}, & -h^*_{s,1,1} \\ h^*_{s,2,2}, & -h^*_{s,1,2} \end{bmatrix} \quad (9)$$

where B is a cross-correlation matrix, which is equal to a channel value of a serving cell portion of the matrix in Equation (7) in the ideal case.

An auto-correlation matrix value must be calculated only in data subcarriers because pilots are not transmitted from both TX antennas in the same subcarrier at the same time.

Herein, the rearranged RX signals are used to obtain an auto-correlation matrix as Equations 10 and 11.

As expressed in Equation (11), an auto-correlation matrix value is equal to $(HH^H+\sigma^2 I)$ in the ideal case. Herein, H is a channel matrix as in Equation (7).

$$r = [r_1(n), r_2(n), r_1(n+1)^*, r_2(n+1)^*]^T \quad (10)$$

$$= [r_{new,1}, r_{new,2}, r_{new,3}, r_{new,4}]^T$$

$$E(rr^H) = E((HS+N)(S^H H^H + N^H)) \quad (11)$$

$$= HH^H + \sigma^2 I$$

$$\approx \frac{1}{S} \begin{bmatrix} \sum_{i=1}^{S} r_{new,1} r^*_{new,1}, & \sum_{i=1}^{S} r_{new,1} r^*_{new,2}, & \sum_{i=1}^{S} r_{new,1} r^*_{new,3}, & \sum_{i=1}^{S} r_{new,1} r^*_{new,4} \\ \sum_{i=1}^{S} r_{new,2} r^*_{new,1}, & \sum_{i=1}^{S} r_{new,2} r^*_{new,2}, & \sum_{i=1}^{S} r_{new,2} r^*_{new,3}, & \sum_{i=1}^{S} r_{new,2} r^*_{new,4} \\ \sum_{i=1}^{S} r_{new,3} r^*_{new,1}, & \sum_{i=1}^{S} r_{new,3} r^*_{new,2}, & \sum_{i=1}^{S} r_{new,3} r^*_{new,3}, & \sum_{i=1}^{S} r_{new,3} r^*_{new,4} \\ \sum_{i=1}^{S} r_{new,4} r^*_{new,1}, & \sum_{i=1}^{S} r_{new,4} r^*_{new,2}, & \sum_{i=1}^{S} r_{new,4} r^*_{new,3}, & \sum_{i=1}^{S} r_{new,4} r^*_{new,4} \end{bmatrix}$$

where S is the number of data subcarriers used for calculation of the auto-correlation in one block, which is 6×M×N (S=6×M×N) if the block size is M symbols by N clusters).

In summary, the cross-correlation and the auto-correlation are calculated respectively as Equation (9) and Equation (11).

In the fourth step, an MMSE weight vector W is calculated from data subcarriers and symbols by using a linear interpolation technique.

Using Equations (4), (8) and (11), an MMSE weight vector W for each block is calculated as Equation (12):

$$W = E(s_{pilot}r^*)(E(r_{new}r_{new}^H))^{-1} \quad (12)$$

$$= \frac{S}{P} \begin{bmatrix} \sum_{i=1}^{P} s_{pilot,i}r_{red,1,i}^*, & \sum_{i=1}^{P} s_{pilot,i}r_{green,1,i}^* \\ \sum_{i=1}^{P} s_{pilot,i}r_{green,2,i}^*, & \sum_{i=1}^{P} s_{pilot,i}r_{red,2,i}^* \\ \left(\sum_{i=1}^{P} s_{pilot,i}r_{green,1,i}^*\right)^*, & -\left(\sum_{i=1}^{P} s_{pilot,i}r_{red,1,i}^*\right)^* \\ \left(\sum_{i=1}^{P} s_{pilot,i}r_{red,2,i}^*\right)^*, & -\left(\sum_{i=1}^{P} s_{pilot,i}r_{green,2,i}^*\right)^* \end{bmatrix}$$

$$\begin{bmatrix} \sum_{i=1}^{S} r_{new,1}r_{new,1}^*, & \sum_{i=1}^{S} r_{new,1}r_{new,2}^*, & \sum_{i=1}^{S} r_{new,1}r_{new,3}^*, & \sum_{i=1}^{S} r_{new,1}r_{new,4}^* \\ \sum_{i=1}^{S} r_{new,2}r_{new,1}^*, & \sum_{i=1}^{S} r_{new,2}r_{new,2}^*, & \sum_{i=1}^{S} r_{new,2}r_{new,3}^*, & \sum_{i=1}^{S} r_{new,2}r_{new,4}^* \\ \sum_{i=1}^{S} r_{new,3}r_{new,1}^*, & \sum_{i=1}^{S} r_{new,3}r_{new,2}^*, & \sum_{i=1}^{S} r_{new,3}r_{new,3}^*, & \sum_{i=1}^{S} r_{new,3}r_{new,4}^* \\ \sum_{i=1}^{S} r_{new,4}r_{new,1}^*, & \sum_{i=1}^{S} r_{new,4}r_{new,2}^*, & \sum_{i=1}^{S} r_{new,4}r_{new,3}^*, & \sum_{i=1}^{S} r_{new,4}r_{new,4}^* \end{bmatrix}$$

where S is the number of data subcarriers, and P is the number of pilots, and MMSE weight vector W is the product of cross-correlation and auto correlation.

The calculated MMSE weight vector W can be linearly interpolated on the symbol and data subcarrier axes.

Figure 9:
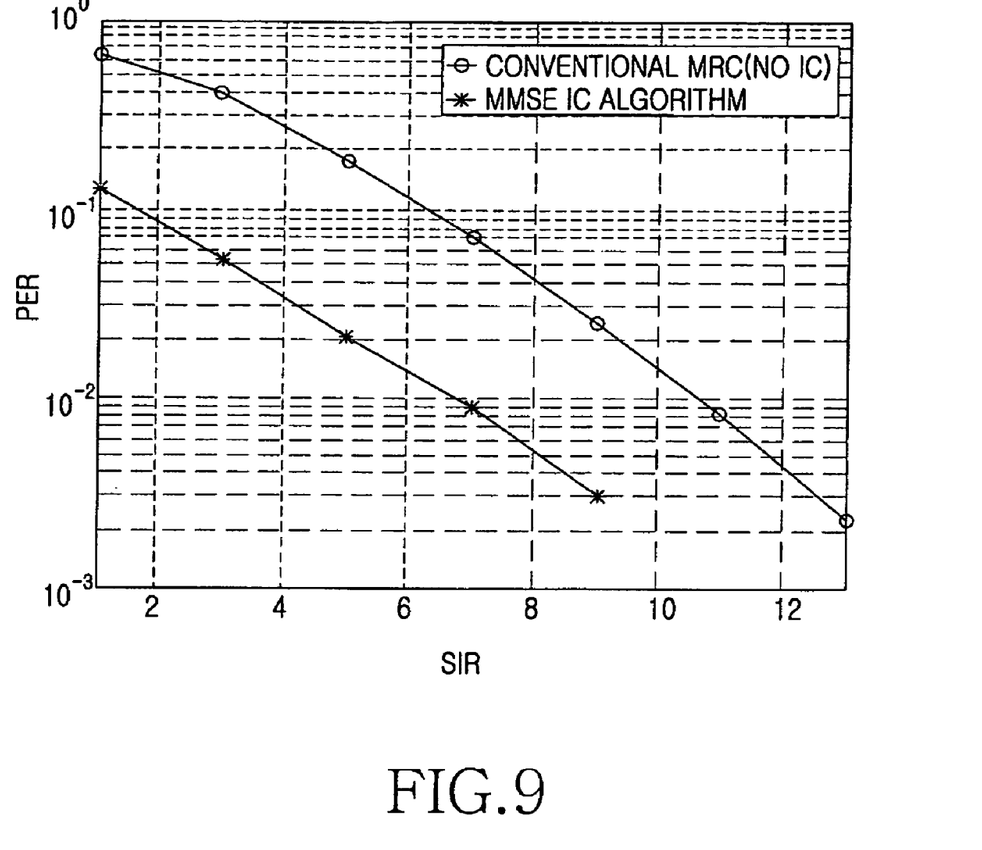
FIG. 9 is a graph illustrating the interference cancellation performance according to an exemplary embodiment of the present invention.

In the fifth step, serving cell signals using the MMSE weight vector are detected using Equation (2). In the STC mode, combination by the MMSE weight vector is to use both an STC decoding technique and an interference cancellation technique. Thus, as illustrated in FIG. 9, the effect of interference is considerably reduced when compared to a conventional reception method (a reception method without interference cancellation, that is, No IC). In FIG. 9, the axis of abscissas represents a Signal-to-Interference Ratio (SIR) and the axis of ordinates represents a Packet Error Rate (PER).

Figure 3:
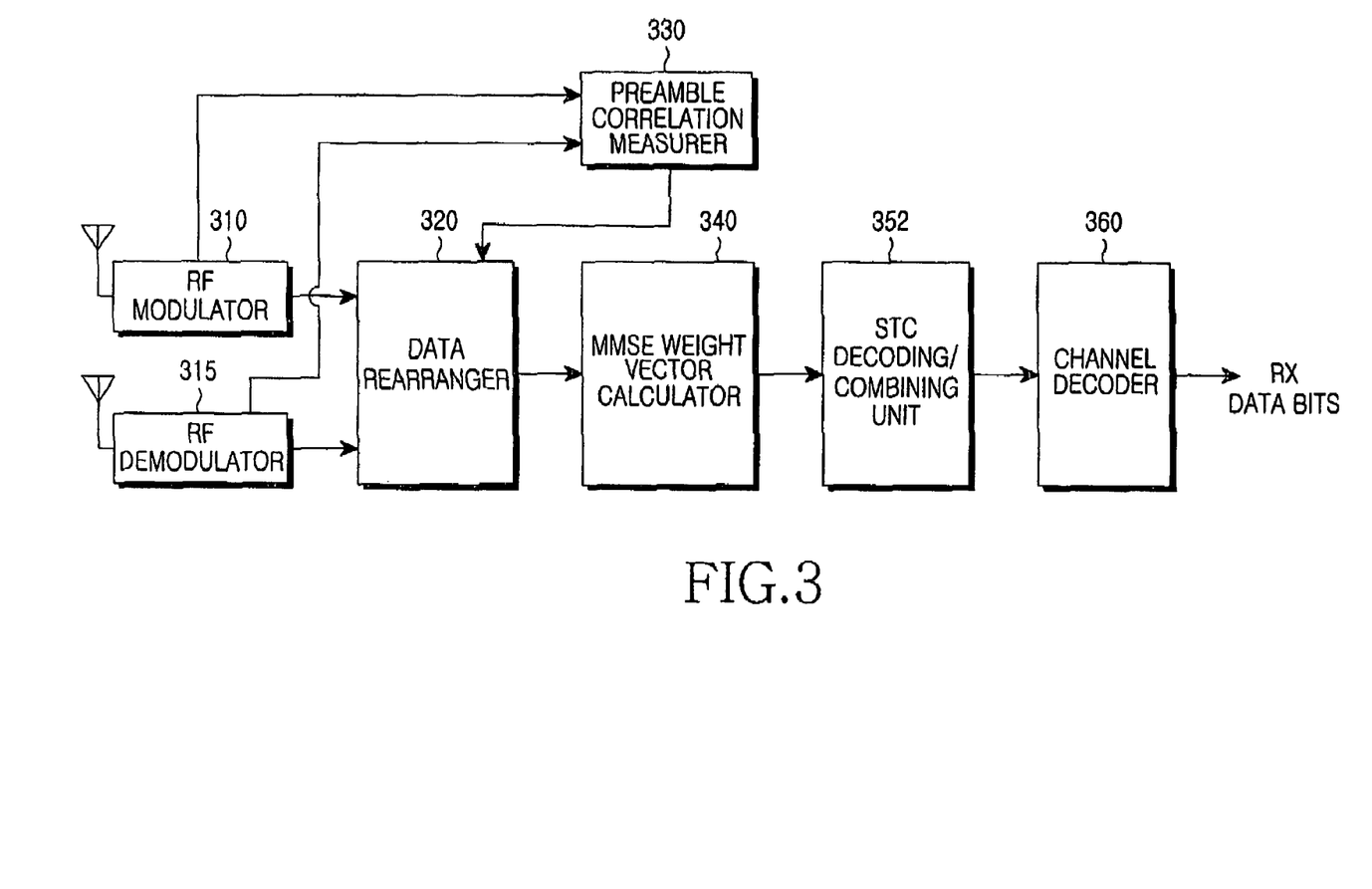
FIG. 3 is a block diagram of a receiver for performing an interference cancellation operation according to an exemplary embodiment of the present invention.

FIG. 3 is a block diagram of a receiver for performing an interference cancellation operation according to an exemplary embodiment of the present invention.

Referring to FIG. 3, the receiver includes RF demodulators 310 and 315, a data rearranger 320, a preamble correlation measurer 330, an MMSE weight vector calculator 340, an STC decoding/combining unit 352, and a channel decoder 360.

The RF demodulators 310 and 315 convert signals received through antennas into baseband signals on which an analog-to-digital conversion process is to be based.

The data rearranger 320 determines an adaptive time/space axis block size of an output signal of the RF demodulator and arranges RX (received) signals in an STC mode. For example, the RX signals are rearranged such that the $(n+1)^{th}$ signal follows the $n^{th}$ signal with respect to all the subcarriers. The data rearranger 320 determines the block size using a preamble correlation (correlation coefficient) received from the preamble correlation measurer 330.

The MMSE weight vector calculator 340 performs cross-correlation for the rearranged RX signals to calculate a cross-correlation matrix, rearranges the cross-correlation results to calculate an STC equivalent channel matrix, and performs auto-correlation to calculate an auto-correlation matrix. Thereafter, an MMSE weight vector W is calculated from data subcarriers and symbols by using a linear interpolation technique, and the MMSE weight vector W is interpolated for each symbol and subcarrier. For example, an MMSE weight vector W for each block is calculated as Equation (12) using Equations (4), (8) and (11).

The STC decoding/combining unit 352 detects serving cell signals from an output signal of the MMSE weight vector calculator 340, combines the detected signals, and performs a channel decoding operation on the detected/combined serving cell signals.

Figure 4:
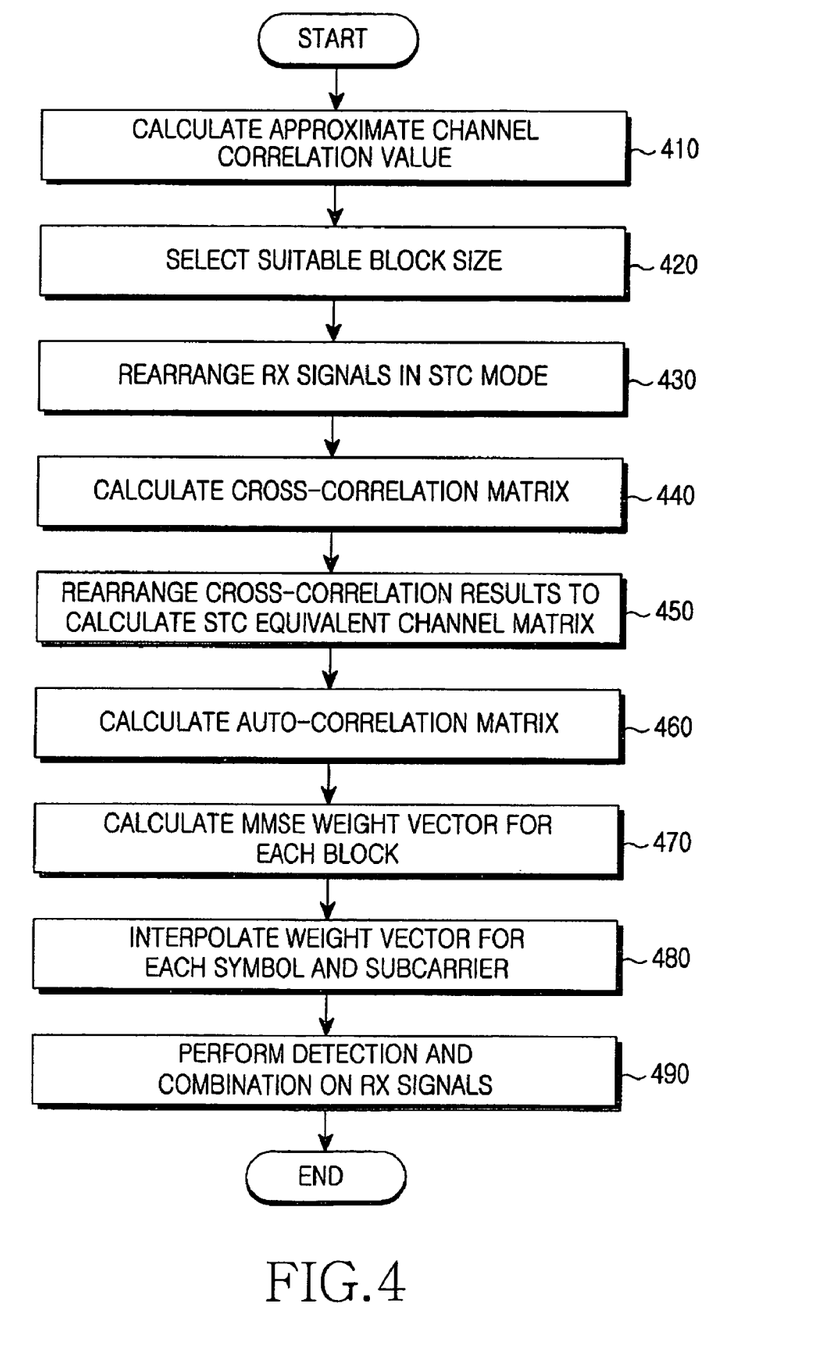
FIG. 4 is a flowchart illustrating an interference cancellation process of a receiver according to an exemplary embodiment of the present invention.

FIG. 4 is a flowchart illustrating an interference cancellation process of a receiver according to an exemplary embodiment of the present invention.

Referring to FIG. 4, the receiver calculates an approximate channel correlation value in step 410. In step 420, the receiver determines a suitable time/frequency axis block size based on the approximate channel correlation value. In step 430, the receiver rearranges RX signals in an STC mode. For example, the RX signals are rearranged such that the $(n+1)^{th}$ signal follows the $n^{th}$ signal with respect to all the subcarriers.

In step 440, the receiver performs cross-correlation for the rearranged RX signals to calculate a cross-correlation matrix. In step 450, the receiver rearranges the cross-correlation results to calculate an STC equivalent channel matrix. In step 460, the receiver performs auto-correlation to calculate an auto-correlation matrix.

In step 470, the receiver calculates an MMSE weight vector W from data subcarriers and symbols by using a linear interpolation technique. For example, an MMSE weight vector W for each block is calculated as Equation (12) using Equations (4), (8) and (11).

In step 480, the receiver interpolates the MMSE weight vector W for each symbol and subcarrier. In step 490, the receiver detects serving cell signals from the RX signals and combines the detected signals. Thereafter, the receiver ends the interference cancellation process.

As described above, exemplary embodiments of the present invention can cancel the inter-cell interference and the estimation performance in the MIMO-based BWA communication system by using the STC-based MIMO channel estimation technique.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiving apparatus for canceling interference in a broadband wireless access (BWA) communication system, the receiving apparatus comprising:
   a wireless communication module for receiving signals from RX antennas;
   a preamble correlation measurer for measuring a preamble correlation coefficient from a preamble of the signal received by the wireless communication module;

a data rearranger for determining a block size to divide the received signal from the preamble correlation coefficient, dividing the signal according to the determined block size, and rearranging the divided signals in a Space-Time coding (STC) mode;

an estimate weight calculator for cross-correlating output signals of the data rearranger, rearranging the cross-correlated signals, auto-correlating the rearranged signals, and calculating an estimate weight to perform an interpolation operation; and an estimate signal decoding/combining unit for detecting desired signals from signals estimated by the estimate weight calculator and combining the detected signals.

2. The receiving apparatus of claim 1, further comprising a channel decoder for performing a channel decoding operation on an output signal of the estimate signal decoding/combining unit.

3. The receiving apparatus of claim 1, wherein the data rearranger determines the block size according a frequency correlation coefficient and a time correlation coefficient in the preamble.

4. The receiving apparatus of claim 1, wherein the data rearranger rearranges the divided signals according to the determined block size such that the $(n+1)^{th}$ signal follows the $n^{th}$ signal with respect to all the subcarriers.

5. The receiving apparatus of claim 1, wherein the estimate weight calculator performs a cross-correlation operation on the output signal of the data rearranger as the following equation:

$$E(s_{pilot}r^H) = \begin{bmatrix} \frac{1}{P}\sum_{i=1}^{P} s_{pilot,i}r^*_{red,1}, & \frac{1}{P}\sum_{i=1}^{P} s_{pilot,i}r^*_{green,1} \\ \frac{1}{P}\sum_{i=1}^{P} s_{pilot,i}r^*_{green,2}, & \frac{1}{P}\sum_{i=1}^{P} s_{pilot,i}r^*_{red,2} \end{bmatrix}$$

$$\approx \begin{bmatrix} h_{s,1,1}, & h_{s,2,1} \\ h_{s,1,2}, & h_{s,2,2} \end{bmatrix}$$

where $S_{pilot}$ denotes a pilot signal of the $i^{th}$ TX antenna, h denotes a channel matrix, $r_{red}$ denotes the product by a channel matrix $h_{1,1}$ in a 2×2 Multiple Input Multiple Output (MIMO) system model, $r_{green}$ denotes the product by a channel matrix $h_{2,1}$ and P denotes the number of pilots, which is M×N for M symbols by N clusters;

rearranges the resulting signals as the following equation:

$$B = \begin{bmatrix} c_{1,1}, & c_{2,1} \\ c_{1,2}, & c_{2,2} \\ c^*_{2,1}, & -c^*_{1,1} \\ c^*_{2,2}, & -c^*_{1,2} \end{bmatrix} \approx \begin{bmatrix} h_{s,1,1}, & h_{s,2,1} \\ h_{s,1,2}, & h_{s,2,2} \\ h^*_{s,2,1}, & -h^*_{s,1,1} \\ h^*_{s,2,2}, & -h^*_{s,1,2} \end{bmatrix}$$

where B denotes a cross-correlation matrix and c denotes a channel coefficient corresponding to each element of the cross-correlation matrix;

and performs an auto-correlation operation on the rearranged signals as the following equation:

$$E(rr^H) = E((HS+N)(S^H H^H + N^H))$$

$$= HH^H + \sigma^2 I$$

$$\approx \frac{1}{S}\begin{bmatrix} \sum_{i=1}^{S} r_{new,1}r^*_{new,1}, & \sum_{i=1}^{S} r_{new,1}r^*_{new,2}, & \sum_{i=1}^{S} r_{new,1}r^*_{new,3}, & \sum_{i=1}^{S} r_{new,1}r^*_{new,4} \\ \sum_{i=1}^{S} r_{new,2}r^*_{new,1}, & \sum_{i=1}^{S} r_{new,2}r^*_{new,2}, & \sum_{i=1}^{S} r_{new,2}r^*_{new,3}, & \sum_{i=1}^{S} r_{new,2}r^*_{new,4} \\ \sum_{i=1}^{S} r_{new,3}r^*_{new,1}, & \sum_{i=1}^{S} r_{new,3}r^*_{new,2}, & \sum_{i=1}^{S} r_{new,3}r^*_{new,3}, & \sum_{i=1}^{S} r_{new,3}r^*_{new,4} \\ \sum_{i=1}^{S} r_{new,4}r^*_{new,1}, & \sum_{i=1}^{S} r_{new,4}r^*_{new,2}, & \sum_{i=1}^{S} r_{new,4}r^*_{new,3}, & \sum_{i=1}^{S} r_{new,4}r^*_{new,4} \end{bmatrix}$$

where S denotes the number of data subcarriers used for calculation of an auto-correlation in one block, which is 6×M×N when the block size is M symbols by N clusters.

6. The receiving apparatus of claim 1, wherein the estimate weight calculator calculates an estimate weight vector for calculation of the estimate weight as the following equation:

$$W = E(s_{pilot}r^*)(E(r_{new}r^H_{new}))^{-1}$$

$$= \frac{S}{P}\begin{bmatrix} \sum_{i=1}^{P} s_{pilot,i}r^*_{red,1,i}, & \sum_{i=1}^{P} s_{pilot,i}r^*_{green,1,i} \\ \sum_{i=1}^{P} s_{pilot,i}r^*_{green,2,i}, & \sum_{i=1}^{P} s_{pilot,i}r^*_{red,2,i} \\ \left(\sum_{i=1}^{P} s_{pilot,i}r^*_{green,1,i}\right)^*, & -\left(\sum_{i=1}^{P} s_{pilot,i}r^*_{red,1,i}\right)^* \\ \left(\sum_{i=1}^{P} s_{pilot,i}r^*_{red,2,i}\right)^*, & -\left(\sum_{i=1}^{P} s_{pilot,i}r^*_{green,2,i}\right)^* \end{bmatrix}^*$$

$$\begin{bmatrix} \sum_{i=1}^{S} r_{new,1}r^*_{new,1}, & \sum_{i=1}^{S} r_{new,1}r^*_{new,2}, & \sum_{i=1}^{S} r_{new,1}r^*_{new,3}, & \sum_{i=1}^{S} r_{new,1}r^*_{new,4} \\ \sum_{i=1}^{S} r_{new,2}r^*_{new,1}, & \sum_{i=1}^{S} r_{new,2}r^*_{new,2}, & \sum_{i=1}^{S} r_{new,2}r^*_{new,3}, & \sum_{i=1}^{S} r_{new,2}r^*_{new,4} \\ \sum_{i=1}^{S} r_{new,3}r^*_{new,1}, & \sum_{i=1}^{S} r_{new,3}r^*_{new,2}, & \sum_{i=1}^{S} r_{new,3}r^*_{new,3}, & \sum_{i=1}^{S} r_{new,3}r^*_{new,4} \\ \sum_{i=1}^{S} r_{new,4}r^*_{new,1}, & \sum_{i=1}^{S} r_{new,4}r^*_{new,2}, & \sum_{i=1}^{S} r_{new,4}r^*_{new,3}, & \sum_{i=1}^{S} r_{new,4}r^*_{new,4} \end{bmatrix}^{-1}$$

where S is the number of data subcarriers, and P is the number of pilots;

and linearly interpolates the calculated estimate weight vector on symbol and data subcarrier axes.

7. The receiving apparatus of claim 1, wherein the estimate signal decoding/combining unit performs the detecting/combining operations using the following equation:

$$\hat{x}_d = WY$$

where $x_d$ denotes data of a serving cell, Y denotes an RX signal, and W denotes an estimate weight vector.

8. A method for canceling the interference of a receiving apparatus in a broadband wireless access (BWA) communication system, the method comprising:

receiving signals from RX antennas;

measuring a preamble correlation coefficient from a preamble of the received signal;

determining a block size to divide the received signal from the preamble correlation coefficient, dividing the signal according to the determined block size, and rearranging the divided signals in a Space-Time coding (STC) mode;

cross-correlating the resulting signals of the rearrangement of the divided signals and rearranging the cross-correlated signals;

auto-correlating the resulting signals of the rearrangement of the cross-correlated signals and calculating an estimate weight to perform an interpolation operation; and detecting desired signals from the resulting signals of the interpolation operation and combining the detected signals.

9. The method of claim 8, further comprising performing a channel decoding operation on the resulting signal of the combination of the detected signals.

10. The method of claim 8, wherein the block size is determined according a frequency correlation coefficient and a time correlation coefficient in the preamble.

11. The method of claim 8, wherein the divided signals are rearranged according to the determined block size such that the $(n+1)^{th}$ signal follows the $n^{th}$ signal with respect to all the subcarriers.

12. The method of claim 8, wherein the cross-correlating operation on the resulting signals of the rearrangement of the divided signals is performed as the following equation:

$$E(s_{pilot}r^H) = \begin{bmatrix} \frac{1}{P}\sum_{i=1}^{P} s_{pilot,i}r^*_{red,1}, & \frac{1}{P}\sum_{i=1}^{P} s_{pilot,i}r^*_{green,1} \\ \frac{1}{P}\sum_{i=1}^{P} s_{pilot,i}r^*_{green,2}, & \frac{1}{P}\sum_{i=1}^{P} s_{pilot,i}r^*_{red,2} \end{bmatrix}$$

$$\approx \begin{bmatrix} h_{s,1,1}, & h_{s,2,1} \\ h_{s,1,2}, & h_{s,2,2} \end{bmatrix}$$

where $S_{pilot}$ denotes a pilot signal of the $i^{th}$ TX antenna, h denotes a channel matrix, $r_{red}$ denotes the product by a channel matrix $h_{1,1}$ in a 2×2 Multiple Input Multiple Output (MIMO) system model, $r_{green}$ denotes the product by a channel matrix $h_{2,1}$, and P denotes the number of pilots, which is M×N for M symbols by N clusters;

and the resulting signals of the cross-correlating operation are rearranged as the following equation:

$$B = \begin{bmatrix} c_{1,1}, & c_{2,1} \\ c_{1,2}, & c_{2,2} \\ c^*_{2,1}, & -c^*_{1,1} \\ c^*_{2,2}, & -c^*_{1,2} \end{bmatrix} \approx \begin{bmatrix} h_{s,1,1}, & h_{s,2,1} \\ h_{s,1,2}, & h_{s,2,2} \\ h^*_{s,2,1}, & -h^*_{s,1,1} \\ h^*_{s,2,2}, & -h^*_{s,1,2} \end{bmatrix}$$

where B denotes a cross-correlation matrix and c denotes a channel coefficient corresponding to each element of the cross-correlation matrix.

13. The method of claim 8, wherein the auto-correlating operation on the resulting signals of the rearrangement of the cross-correlated signals is performed as the following equation:

$$E(rr^H) = E((HS+N)(S^H H^H + N^H))$$

$$= HH^H + \sigma^2 I$$

$$\approx \frac{1}{S}\begin{bmatrix} \sum_{i=1}^{S} r_{new,1}r^*_{new,1}, & \sum_{i=1}^{S} r_{new,1}r^*_{new,2}, & \sum_{i=1}^{S} r_{new,1}r^*_{new,3}, & \sum_{i=1}^{S} r_{new,1}r^*_{new,4} \\ \sum_{i=1}^{S} r_{new,2}r^*_{new,1}, & \sum_{i=1}^{S} r_{new,2}r^*_{new,2}, & \sum_{i=1}^{S} r_{new,2}r^*_{new,3}, & \sum_{i=1}^{S} r_{new,2}r^*_{new,4} \\ \sum_{i=1}^{S} r_{new,3}r^*_{new,1}, & \sum_{i=1}^{S} r_{new,3}r^*_{new,2}, & \sum_{i=1}^{S} r_{new,3}r^*_{new,3}, & \sum_{i=1}^{S} r_{new,3}r^*_{new,4} \\ \sum_{i=1}^{S} r_{new,4}r^*_{new,1}, & \sum_{i=1}^{S} r_{new,4}r^*_{new,2}, & \sum_{i=1}^{S} r_{new,4}r^*_{new,3}, & \sum_{i=1}^{S} r_{new,4}r^*_{new,4} \end{bmatrix}$$

where S denotes the number of data subcarriers used for calculation of an auto-correlation in one block, which is 6×M×N when the block size is M symbols by N clusters;

an estimate weight vector for calculation of the estimate weight is calculated as the following equation:

$$W = E(s_{pilot}r^*)(E(r_{new}r^H_{new}))^{-1}$$

$$= \frac{S}{P}\begin{bmatrix} \sum_{i=1}^{P} s_{pilot,i}r^*_{red,1,i}, & \sum_{i=1}^{P} s_{pilot,i}r^*_{green,1,i} \\ \sum_{i=1}^{P} s_{pilot,i}r^*_{green,2,i}, & \sum_{i=1}^{P} s_{pilot,i}r^*_{red,2,i} \\ \left(\sum_{i=1}^{P} s_{pilot,i}r^*_{green,1,i}\right)^*, & -\left(\sum_{i=1}^{P} s_{pilot,i}r^*_{red,1,i}\right)^* \\ \left(\sum_{i=1}^{P} s_{pilot,i}r^*_{red,2,i}\right)^*, & -\left(\sum_{i=1}^{P} s_{pilot,i}r^*_{green,2,i}\right)^* \end{bmatrix} *$$

$$\begin{bmatrix} \sum_{i=1}^{S} r_{new,1}r^*_{new,1}, & \sum_{i=1}^{S} r_{new,1}r^*_{new,2}, & \sum_{i=1}^{S} r_{new,1}r^*_{new,3}, & \sum_{i=1}^{S} r_{new,1}r^*_{new,4} \\ \sum_{i=1}^{S} r_{new,2}r^*_{new,1}, & \sum_{i=1}^{S} r_{new,2}r^*_{new,2}, & \sum_{i=1}^{S} r_{new,2}r^*_{new,3}, & \sum_{i=1}^{S} r_{new,2}r^*_{new,4} \\ \sum_{i=1}^{S} r_{new,3}r^*_{new,1}, & \sum_{i=1}^{S} r_{new,3}r^*_{new,2}, & \sum_{i=1}^{S} r_{new,3}r^*_{new,3}, & \sum_{i=1}^{S} r_{new,3}r^*_{new,4} \\ \sum_{i=1}^{S} r_{new,4}r^*_{new,1}, & \sum_{i=1}^{S} r_{new,4}r^*_{new,2}, & \sum_{i=1}^{S} r_{new,4}r^*_{new,3}, & \sum_{i=1}^{S} r_{new,4}r^*_{new,4} \end{bmatrix}^{-1}$$

where S is the number of data subcarriers, and P is the number of pilots;

and the calculated estimate weight vector is linearly interpolated on symbol and data subcarrier axes.

14. The method of claim 8, wherein the desired signals are detected and combined using the following equation:

$$\tilde{x}_d = WY$$

where $x_d$ denotes data of a serving cell, Y denotes an RX signal, and W denotes an estimate weight vector.

15. A system for interference cancellation in a broadband wireless access (BWA) communication system, the system comprising:

a plurality of base stations for transmitting signals; and a receiving apparatus for receiving signals from the base stations; measuring a preamble correlation coefficient from a preamble of the received signal; determining a block size to divide the received signal from the preamble correlation coefficient, dividing the signal according to the determined block size, and rearranging the divided signals in a Space-Time coding (STC) mode; cross-correlating the resulting signals of the rearrangement of the divided signals and rearranging the cross-correlated signals; auto-correlating the resulting signals of the rearrangement of the cross-correlated signals and calculating an estimate weight to perform an interpolation operation; and detecting desired signals from the resulting signals of the interpolation operation and combining the detected signals.

16. The system of claim 15, wherein the receiving apparatus further performs a channel decoding operation on the resulting signal of the combination of the detected signals.

17. The system of claim 15, wherein the receiving apparatus determines the block size according a frequency correlation coefficient and a time correlation coefficient in the preamble.

18. The system of claim 15, wherein the receiving apparatus rearranges the divided signals according to the determined block size such that the $(n+1)^{th}$ signal follows the $n^{th}$ signal with respect to all the subcarriers.

19. The system of claim 15, wherein the receiving apparatus performs the cross-correlating operation on the resulting signals of the rearrangement of the divided signals as the following equation:

$$E(s_{pilot} r^H) = \begin{bmatrix} \frac{1}{P}\sum_{i=1}^{P} s_{pilot,i} r^*_{red,1}, & \frac{1}{P}\sum_{i=1}^{P} s_{pilot,i} r^*_{green,1} \\ \frac{1}{P}\sum_{i=1}^{P} s_{pilot,i} r^*_{green,2}, & \frac{1}{P}\sum_{i=1}^{P} s_{pilot,i} r^*_{red,2} \end{bmatrix}$$

$$\approx \begin{bmatrix} h_{s,1,1}, h_{s,2,1} \\ h_{s,1,2}, h_{s,2,2} \end{bmatrix}$$

where $S_{pilot}$ denotes a pilot signal of the $i^{th}$ TX antenna, h denotes a channel matrix, $r_{red}$ denotes the product by a channel matrix $h_{1,1}$ in a 2×2 Multiple Input Multiple Output (MIMO) system model, $r_{green}$ denotes the product by a channel matrix $h_{2,1}$, and P denotes the number of pilots, which is M×N for M symbols by N clusters;

and rearranges the resulting signals of the cross-correlating operation as the following equation:

$$B = \begin{bmatrix} c_{1,1}, c_{2,1} \\ c_{1,2}, c_{2,2} \\ c^*_{2,1}, -c^*_{1,1} \\ c^*_{2,2}, -c^*_{1,2} \end{bmatrix} \approx \begin{bmatrix} h_{s,1,1}, h_{s,2,1} \\ h_{s,1,2}, h_{s,2,2} \\ h^*_{s,2,1}, -h^*_{s,1,1} \\ h^*_{s,2,2}, -h^*_{s,1,2} \end{bmatrix}$$

where B denotes a cross-correlation matrix and c denotes a channel coefficient corresponding to each element of the cross-correlation matrix.

20. The system of claim 15, wherein the receiving apparatus performs the auto-correlating operation on the resulting signals of the rearrangement of the cross-correlated signals as the following equation:

$$E(rr^H) = E((HS+N)(S^H H^H + N^H))$$

$$= HH^H + \sigma^2 I$$

$$\approx \frac{1}{S} \begin{bmatrix} \sum_{i=1}^{S} r_{new,1} r^*_{new,1}, & \sum_{i=1}^{S} r_{new,1} r^*_{new,2}, & \sum_{i=1}^{S} r_{new,1} r^*_{new,3}, & \sum_{i=1}^{S} r_{new,1} r^*_{new,4} \\ \sum_{i=1}^{S} r_{new,2} r^*_{new,1}, & \sum_{i=1}^{S} r_{new,2} r^*_{new,2}, & \sum_{i=1}^{S} r_{new,2} r^*_{new,3}, & \sum_{i=1}^{S} r_{new,2} r^*_{new,4} \\ \sum_{i=1}^{S} r_{new,3} r^*_{new,1}, & \sum_{i=1}^{S} r_{new,3} r^*_{new,2}, & \sum_{i=1}^{S} r_{new,3} r^*_{new,3}, & \sum_{i=1}^{S} r_{new,3} r^*_{new,4} \\ \sum_{i=1}^{S} r_{new,4} r^*_{new,1}, & \sum_{i=1}^{S} r_{new,4} r^*_{new,2}, & \sum_{i=1}^{S} r_{new,4} r^*_{new,3}, & \sum_{i=1}^{S} r_{new,4} r^*_{new,4} \end{bmatrix}$$

where S denotes the number of data subcarriers used for calculation of an auto-correlation in one block, which is 6×M×N when the block size is M symbols by N clusters; calculates an estimate weight vector for calculation of the estimate weight as the following equation:

$$W = E(s_{pilot} r^*)(E(r_{new} r^H_{new}))^{-1}$$

$$= \frac{S}{P} \begin{bmatrix} \sum_{i=1}^{P} s_{pilot,i} r^*_{red,1,i}, & \sum_{i=1}^{P} s_{pilot,i} r^*_{green,1,i} \\ \sum_{i=1}^{P} s_{pilot,i} r^*_{green,2,i}, & \sum_{i=1}^{P} s_{pilot,i} r^*_{red,2,i} \\ \left(\sum_{i=1}^{P} s_{pilot,i} r^*_{green,1,i}\right)^*, & -\left(\sum_{i=1}^{P} s_{pilot,i} r^*_{red,1,i}\right)^* \\ \left(\sum_{i=1}^{P} s_{pilot,i} r^*_{red,2,i}\right)^*, & -\left(\sum_{i=1}^{P} s_{pilot,i} r^*_{green,2,i}\right)^* \end{bmatrix} *$$

$$\begin{bmatrix} \sum_{i=1}^{S} r_{new,1} r^*_{new,1}, & \sum_{i=1}^{S} r_{new,1} r^*_{new,2}, & \sum_{i=1}^{S} r_{new,1} r^*_{new,3}, & \sum_{i=1}^{S} r_{new,1} r^*_{new,4} \\ \sum_{i=1}^{S} r_{new,2} r^*_{new,1}, & \sum_{i=1}^{S} r_{new,2} r^*_{new,2}, & \sum_{i=1}^{S} r_{new,2} r^*_{new,3}, & \sum_{i=1}^{S} r_{new,2} r^*_{new,4} \\ \sum_{i=1}^{S} r_{new,3} r^*_{new,1}, & \sum_{i=1}^{S} r_{new,3} r^*_{new,2}, & \sum_{i=1}^{S} r_{new,3} r^*_{new,3}, & \sum_{i=1}^{S} r_{new,3} r^*_{new,4} \\ \sum_{i=1}^{S} r_{new,4} r^*_{new,1}, & \sum_{i=1}^{S} r_{new,4} r^*_{new,2}, & \sum_{i=1}^{S} r_{new,4} r^*_{new,3}, & \sum_{i=1}^{S} r_{new,4} r^*_{new,4} \end{bmatrix}^{-1}$$

where S is the number of data subcarriers, and P is the number of pilots;

and linearly interpolates the calculated estimate weight vector on symbol and data subcarrier axes.

21. The system of claim 15, wherein the receiving apparatus detects and combines the desired signals using the following equation:

$$\hat{x}_d = WY$$

where $x_d$ denotes data of a serving cell, Y denotes an RX signal, and W denotes an estimate weight vector.

* * * * *